United States Patent
Duthel et al.

(10) Patent No.: US 9,716,555 B2
(45) Date of Patent: Jul. 25, 2017

(54) COMMON MODE REJECTION RATIO CONTROL FOR COHERENT OPTICAL RECEIVERS

(71) Applicant: Cisco Technology, Inc., San Jose, CA (US)

(72) Inventors: Thomas Duthel, Nuremberg (DE); Juergen Hauenschild, Bochum (DE); Theodor Kupfer, Feucht (DE)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/092,984

(22) Filed: Apr. 7, 2016

(65) Prior Publication Data

US 2016/0226595 A1 Aug. 4, 2016

Related U.S. Application Data

(62) Division of application No. 14/202,293, filed on Mar. 10, 2014, now Pat. No. 9,337,937.

(51) Int. Cl.
*H04B 10/61* (2013.01)
*H04B 10/06* (2006.01)
*H04B 10/079* (2013.01)

(52) U.S. Cl.
CPC ..... *H04B 10/616* (2013.01); *H04B 10/07955* (2013.01)

(58) Field of Classification Search
None
See application file for complete search history.

(56) References Cited

U.S. PATENT DOCUMENTS

| | | | |
|---|---|---|---|
| 4,001,826 A | 1/1977 | Moulton | |
| 4,718,121 A * | 1/1988 | Epworth | H04B 10/63 398/203 |

(Continued)

FOREIGN PATENT DOCUMENTS

| | | |
|---|---|---|
| EP | 0194786 A2 | 9/1986 |
| EP | 1779558 B1 | 5/2007 |

OTHER PUBLICATIONS

Meijerink, et al., "Balanced Optical Phase Diversity Receivers for Coherence Multiplexing," Journal of Lightwave Technology, IEEE Service Center, New York, NY, US, vol. 22, No. 11, Nov. 2004, pp. 2393-2408 (16 pages).

(Continued)

*Primary Examiner* — Oommen Jacob
(74) *Attorney, Agent, or Firm* — Edell, Shapiro & Finnan, LLC (57) ABSTRACT

An optical signal is received at a coherent optical receiver. The received optical signal is converted to a first electrical signal and a second electrical signal through a first photodetector and a second photodetector, respectively. The first electrical signal is input into a first single input variable gain amplifier, and the second electrical signal is input into a second single input variable gain amplifier. A gain of at least one of the first single input variable gain amplifier or the second single input variable gain amplifier is controlled to balance the output of the first single input variable gain amplifier and the output of the second single input variable gain amplifier. The output of the first single input variable gain amplifier and the output of the second single input variable gain amplifier are input into a differential amplifier. A receiver output is obtained at an output of the differential amplifier.

20 Claims, 8 Drawing Sheets

(56) References Cited

U.S. PATENT DOCUMENTS

| | | | |
|---|---|---|---|
| 4,888,817 A | 12/1989 | Ryu et al. | |
| 4,972,515 A | 11/1990 | Shibutani | |
| 5,052,051 A | 9/1991 | Naito et al. | |
| 5,075,793 A | 12/1991 | Schiffner | |
| 5,115,332 A | 5/1992 | Naito et al. | |
| 5,253,097 A | 10/1993 | Naito et al. | |
| 5,491,682 A | 2/1996 | Dohmeier et al. | |
| 6,268,814 B1* | 7/2001 | Kolsrud | H03M 1/0641 341/131 |
| 6,775,484 B1 | 8/2004 | Pfeiffer | |
| 7,330,669 B2* | 2/2008 | Moeller | H04B 10/64 398/202 |
| 7,373,091 B2 | 5/2008 | Moeller | |
| 7,406,269 B2 | 7/2008 | Becker et al. | |
| 7,477,852 B2 | 1/2009 | Agarwal et al. | |
| 7,688,918 B2 | 3/2010 | Koc | |
| 7,734,193 B2 | 6/2010 | Day | |
| 7,877,020 B1* | 1/2011 | Hayes | H04B 10/50 398/183 |
| 8,478,138 B2 | 7/2013 | Sugawara et al. | |
| 2002/0167708 A1* | 11/2002 | Tsao | H04B 10/118 398/204 |
| 2004/0208643 A1* | 10/2004 | Roberts | H04B 10/61 398/186 |
| 2005/0237882 A1 | 10/2005 | Honobe | |
| 2008/0205905 A1* | 8/2008 | Tao | H04B 10/61 398/204 |
| 2009/0142076 A1* | 6/2009 | Li | H04B 10/61 398/208 |
| 2011/0268442 A1 | 11/2011 | Boertjes et al. | |
| 2013/0028596 A1* | 1/2013 | Suzuki | H04B 10/6931 398/25 |
| 2013/0156424 A1 | 6/2013 | Youn et al. | |
| 2013/0294784 A1 | 11/2013 | Suzuki | |
| 2013/0343751 A1 | 12/2013 | Mamyshev | |
| 2014/0279216 A1 | 9/2014 | Desmarais et al. | |
| 2015/0256266 A1 | 9/2015 | Duthel et al. | |
| 2015/0295660 A1* | 10/2015 | Suzuki | H03F 3/08 398/208 |
| 2016/0226595 A1* | 8/2016 | Duthel | H04B 10/07955 |

OTHER PUBLICATIONS

Abhay Joshi et al., "Coherent Optical Receiver System with Balanced Photodetection," Proceedings of SPIE, vol. 6243, May 2006, 14 pages.

International Search Report and Written Opinion in corresponding International Application No. PCT/US2015/019558, mailed May 6, 2015, 11 pages.

* cited by examiner

COMMON MODE REJECTION RATIO CONTROL FOR COHERENT OPTICAL RECEIVERS

RELATED APPLICATIONS

This application is a divisional application of U.S. patent application Ser. No. 14/202,293, filed on Ma. 10, 2014, the entirety of which is incorporated herein by reference.

TECHNICAL FIELD

The present disclosure relates to optical signal receivers, and in particular, coherent optical receivers.

BACKGROUND

Coherent optical receivers are utilized in optical communication systems to linearly convert the optical field of an optical channel into the electric domain. The optical field may contain several optical channels at different carrier frequencies/wavelengths. Specifically, through the use of a local oscillator in conjunction with an optical 90° hybrid and a set of photodetectors, a channel of interest may be separated from a multichannel signal, thus no optical filters are required.

DESCRIPTION OF EXAMPLE EMBODIMENTS

Overview

An optical signal is received at a coherent optical receiver. The received optical signal is converted to a first electrical signal and a second electrical signal through a first photodetector and a second photodetector, respectively. The first electrical signal is input into a first single input variable gain amplifier, and the second electrical signal is input into a second single input variable gain amplifier. A gain of at least one of the first single input variable gain amplifier or the second single input variable gain amplifier is controlled to balance the output of the first single input variable gain amplifier and the output of the second single input variable gain amplifier. The output of the first single input variable gain amplifier and the output of the second single input variable gain amplifier are input into a differential amplifier. A receiver output is obtained at an output of the differential amplifier.

Example Embodiments

In addition to linearly detected portions of the desired optical channel, direct detected (i.e., non-linearly detected) signals may also be detected by the photodetectors, and will also be converted to the electrical domain according to the square law under which photodetectors operate. In order to eliminate the aforementioned directly detected components, balanced detection schemes are used. For example, an optical hybrid may output two in-phase signals which both contain the desired channel signal, but with a different sign. Both signals will be converted to the electrical domain by respective photodetectors. In a theoretically perfect coherent optical receiver the optical 90° hybrid outputs identical signals (other than the sign difference). The outputs of the optical 90° hybrid are identically aligned with two identical photodetectors, and when the outputs of the two photodetectors are input into a differential amplifier, the directly detected components will perfectly cancel each other out, leaving only the desired, linearly detected channel as the output of the differential amplifier.

In reality, differences in the optical 90° hybrid outputs and differences in the photodetectors will result in an imperfect cancellation of the directly detected components in the differential amplifier. These differences in the components along the optical paths to the differential amplifier result in gain differences between the two paths. The common mode rejection ratio ("CMRR") is a measure of the equality between the gains along the two paths and is defined as:

$$CMRR = -20\log_{10}\left(\frac{|g_1 - g_2|}{g_1 + g_2}\right);$$

wherein $g_t$ is the gain along one of the paths and $g_2$ is the gain along the other path. When the gains of the two paths are closer, the coherent optical receiver has a greater, and therefore improved, CMRR. When the gains are different, the coherent optical receiver has a smaller, and therefore, worse CMRR.

Figure 1:
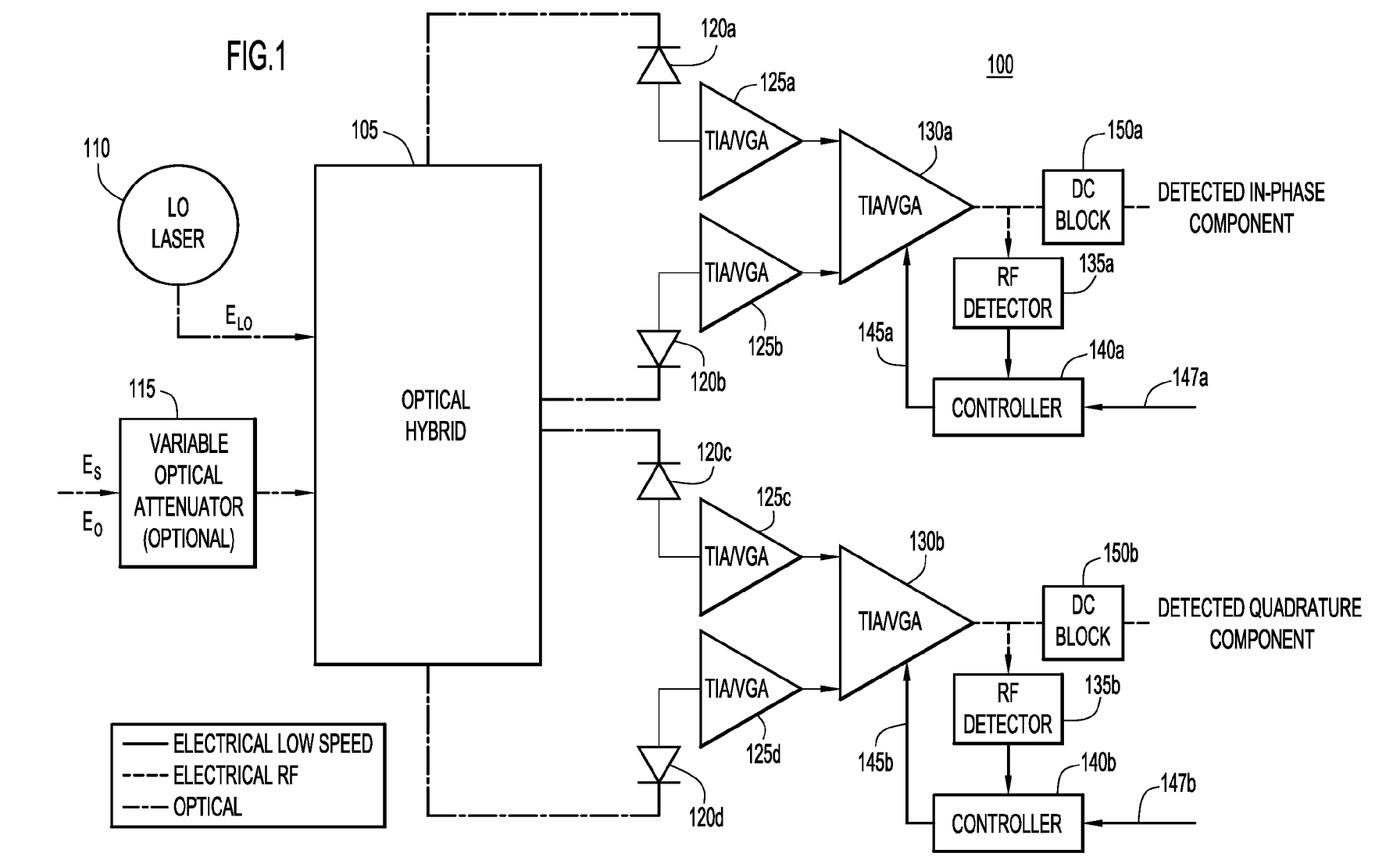
FIG. 1 is a coherent optical receiver configured to provide common mode rejection ratio control according to an example embodiment.

Referring to FIG. 1, a coherent optical receiver 100 is shown that is configured to provide improved CMRR according to the embodiments presented herein. Specifically, coherent optical receiver 100 includes an optical hybrid 105 that receives a local laser oscillator 110 and a multi-channel optical signal which may undergo attenuation at variable optical attenuator 115. The multi-channel optical signal may contain an optical channel of interest and may also contain additional channels. The optical hybrid 105 in conjunction with the signal form the local oscillator 110 and the photo detectors 120a-d separates the optical signal into in-phase and quadrature components of the received optical field.

This separation results in two in-phase signals and two quadrature signals. A first of the two in-phase signals results from the superposition of the received optical signal added to the local laser oscillator 110 signal, and the second in-phase signal results from the difference between the local laser oscillator signal and the received optical signal. Also included in the output signals are directly detected components which act like noise to the detected in-phase and quadrature components. These same directly detected components will be present in both the first and second output optical signals. Optical hybrid 105 also outputs two quadrature signals, a first quadrature signal that that results from the superposition of the received optical signal added to the local laser oscillator 110 signal, and the second quadrature signal that results from the difference between the local laser oscillator signal and the received optical signal. The same directly detected components may also be present in both the first and second quadrature signals, though the directly detected components in the quadrature signals may be different than those present in the in-phase signals.

Photodetectors 120a-d convert received optical signals into electrical signals. For example, if photodetectors 120a-d are embodied as photodiodes, they may be configured to convert an optical signal into a current-based electrical signal. The output of for the first in-phase signal channel at output of photodetector 120a may take the form of:

$$g_1(\sim|E_{LO}|^2+\Sigma|E_O|^2|E_S|^2+2Re\{E_S E_{LO}^*\}).$$

wherein $E_{LO}$ is the local oscillator signal, $E_0$ is the signal for the other, undesired channels of the input optical signal, $E_s$ is the signal for the desired optical channel, and $g_i$ is the gain for the optical path (i.e., tributary) of the first optical signal. The output of for the second in-phase signal channel at output of photodetector 120b will take the form of:

$$g_2(\sim|E_{LO}|^2+\Sigma|E_O|^2+|E_S|^2-2Re\{E_S E_{LO}^*\});$$

wherein $g_2$ is the gain for the second optical path or tributary. Gain $g_1$ will be a function of the optical loss and responsivity of photodetector 120a, while gain $g_2$ will be a function of the optical loss and responsivity of photodetector 120b.

In a perfect theoretical coherent optical receiver, photodetectors 120a-d would be selected such that the optical loss and responsivity of photodetectors 120a-d would be identical. In such a theoretical set-up, the gain associated with each of the photodetectors 120a-d would be identical. In reality, each of photodetectors 120a-d may have a different level of gain. For example, normal fluctuations in the quality of photodetectors 120a-d may result in photodetectors with different levels of optical loss and responsivity. Similarly, differences in alignment between the output of optical hybrid 105 and each of photodetectors 120a-d may result in different levels of optical loss for each of photodetectors 120a-d. Furthermore the loss through individual paths of the optical hybrid itself may be different. Accordingly, $g_1$ and $g_2$ will be different for each of the two signal paths. In order to account for these differences, the output of each of photodetectors 120a-d is input to variable amplifiers 125a-d, respectively.

Variable amplifiers 125a-d may be individually controlled to compensate for the gain differences between the individual optical paths/tributaries and photodetectors 120a-d through methods described below with reference to FIGS. 3-6. For example, if photodetector 120a experiences less optical loss and is more responsive than photodetector 120b, the gain of variable gain amplifier 125b may be increased relative to that of variable gain amplifier 125a such that the combined gain of the optical path feeding photodetector 120b and the photodetector 120b and variable amplifier 120b matches the combined gain of the optical path feeding photodetector 120a and the photodetector 120a and variable gain amplifier 125a. Similarly, the gain of variable gain amplifier 125a may be decreased relative to that of variable gain amplifier 125b such that the combined gain of the optical path feeding photodetector 120b and the photodetector 120b and variable amplifier 120b matches the combined gain of photodetector 120a and variable gain amplifier 125a. According to other examples, a combination of increasing and decreasing the gains for variable gain amplifiers 125a and 125b may be utilized to match the combined gain of the optical path feeding photodetector 120a and the photodetector 120a and variable gain amplifier 125a to that of the optical path feeding photodetector 120b and the photodetector 120b and variable gain amplifier 125b. Similarly, the gains of variable gain amplifiers 125c and 125d may be controlled to match the combined gain of the optical path feeding photodetector 120c and the photodetector 120c and variable gain amplifier 125c to that of the optical path feeding photodetector 120d, as well as the photodetector 120d and variable gain amplifier 125d.

The outputs of variable gain amplifiers 125a and 125b are fed into differential amplifier 130a. Differential amplifier 130a may be a variable gain differential amplifier. Because variable gain amplifiers 125a and 125b balance the combined gains for the signals prior to differential amplifier 130a, the unwanted portions of the optical signal (i.e., the directly detected signal components) will cancel out, allowing the output of differential amplifier 130a to accurately reflect the in-phase portion of the optical signal input to optical hybrid 105. Similarly, the outputs of variable gain amplifiers 125c and 125d are fed into differential amplifier 130b. Differential amplifier 130b may also be a variable gain differential amplifier. Because variable gain amplifiers 125c and 125d balance the combined gains for the signals prior to differential amplifier 130b, the unwanted portions of the signal output by optical hybrid 105 will be cancelled out by differential amplifier 130b, allowing the output of differential amplifier 130b to accurately reflect the quadrature portion of the of optical signal input to optical hybrid 105.

Coherent optical receiver 100 may also include radio frequency ("RF") detectors 135a and 135b to measure the output of the differential amplifiers 130a and 130b, respectively. The outputs measured by RF detectors 135a and 135b may be fed to controllers 140a and 140b, respectively. Controllers 140a and 140b may then send control signals 145a and 145b back to differential amplifiers 130a and 130b. Control signals 145a and 145b may be configured to, for example, alter the gain provided by differential amplifiers 130a and 130b. Specifically, the device receiving the output of coherent optical receiver 100 will expect to see a limited output swing in the output power of coherent optical receiver 100, determined by set values 147a and 147b. Accordingly, RF detector 135a and controller 140a serve as a feedback to differential amplifier 130a, and RF detector 135b and controller 140b serve as a feedback to differential amplifier 130b.

Finally, the output of differential amplifiers 130a and 130b may be input to direct current ("DC") blocks 150a and 150b, respectively, to eliminate the direct current portion of the detected signal.

Figure 2:
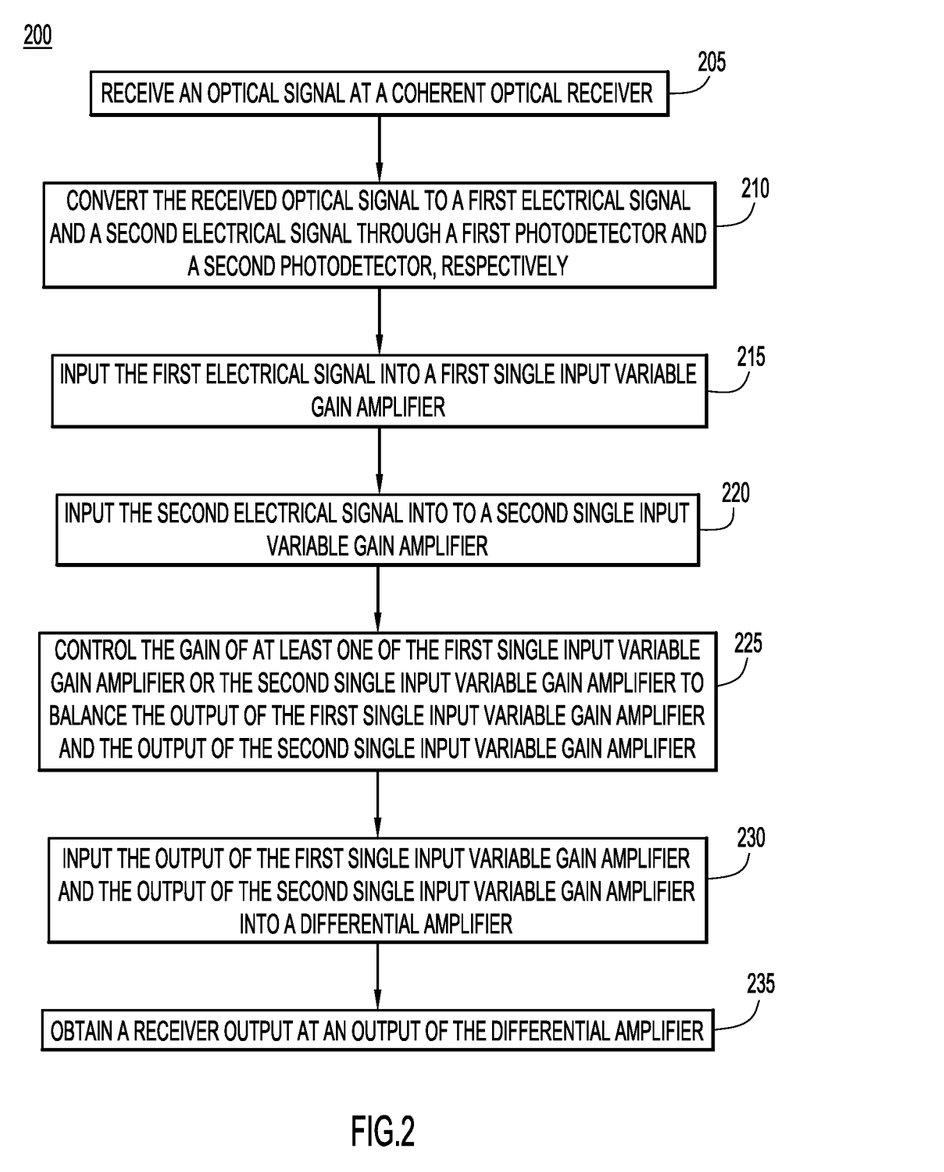
FIG. 2 is a flowchart illustrating a process for carrying out common mode rejection ratio control according to an example embodiment.

With reference now to FIG. 2, depicted therein is flowchart illustrating a method 200 for providing common mode rejection ratio control in coherent optical receivers. The method 200 begins in 205 where an optical signal is received at a coherent optical receiver. In 210, the received optical signal is converted to a first electrical signal and a second electrical signal through a first photodetector and a second photodetector, respectively. The conversion of the optical signal into the two electrical signals may include inputting the received optical signal into an optical 90° hybrid, and inputting the in-phase outputs of the optical 90° hybrid into respective photodetectors and/or inputting the quadrature outputs of the optical 90° hybrid into respective photodetectors In 215, the first electrical signal is input into a first variable gain amplifier, and in 220 the second electrical signal is input into a second variable gain amplifier. The first and second variable gain amplifiers may include single input variable gain amplifiers and/or variable gain transimpedance amplifiers.

In 225, the gain of at least one of the first and second variable gain amplifiers is controlled to balance the output of the first variable gain amplifier with the output of the second variable gain amplifier. Within the context of the example of FIG. 1, balancing the output of the first and second variable gain amplifiers may include adjusting the gain of at least one of the first and second variable gain amplifiers so that the combined gain for the variable gain amplifier, the photodetector and the optical path for the first in-phase signal matches the combined gain of the variable gain amplifier, the photodetector and the optical path for the second in-phase signal. Further examples of controlling the gain of at least one of the first and second variable gain amplifiers will be described below with reference to FIGS. 3-6.

In 230, the output of the first variable gain amplifier and the output of the second variable gain amplifier are input into a differential amplifier. The differential amplifier may comprise a variable differential amplifier and/or a differential transimpedance amplifier.

Finally, in 235 an output for the coherent optical receiver is received from the output of the differential amplifier. Receiving the output for the coherent optical receiver may further include measuring the output of the differential gain receiver to generate and send a control signal to the differential amplifier. In other words, the output of the differential amplifier may be measured in order to provide a feedback control mechanism for the individual gains of the variable gain amplifiers, as will be described with reference to FIGS. 4-6. Accordingly to other examples, this feedback control mechanism may be based upon a measure of the direct current signal sent the variable gain amplifiers, as will be described with reference to FIG. 3. Furthermore, the output of the differential amplifier may be sent through a DC block.

Accordingly, by measuring an electrical signal corresponding to an optical signal input to the coherent optical receiver (either the RF signal or the direct current through the photodetectors of the tributaries of the coherent optical receiver) CMRR in the coherent optical receiver may be improved. From the measured electrical signal a difference in a gain along a first tributary of the coherent optical receiver and a gain along a second tributary of the coherent optical received may be determined. The gain of at least one of the variable gain amplifier of the first tributary or the variable gain amplifier of the second tributary may be controlled to balance the gain along the first tributary and the gain along the second tributary. In other words, CMRR improvement is may be provided through feedback control of variable gain amplifiers along the tributaries of a coherent optical receiver.

Figure 3:
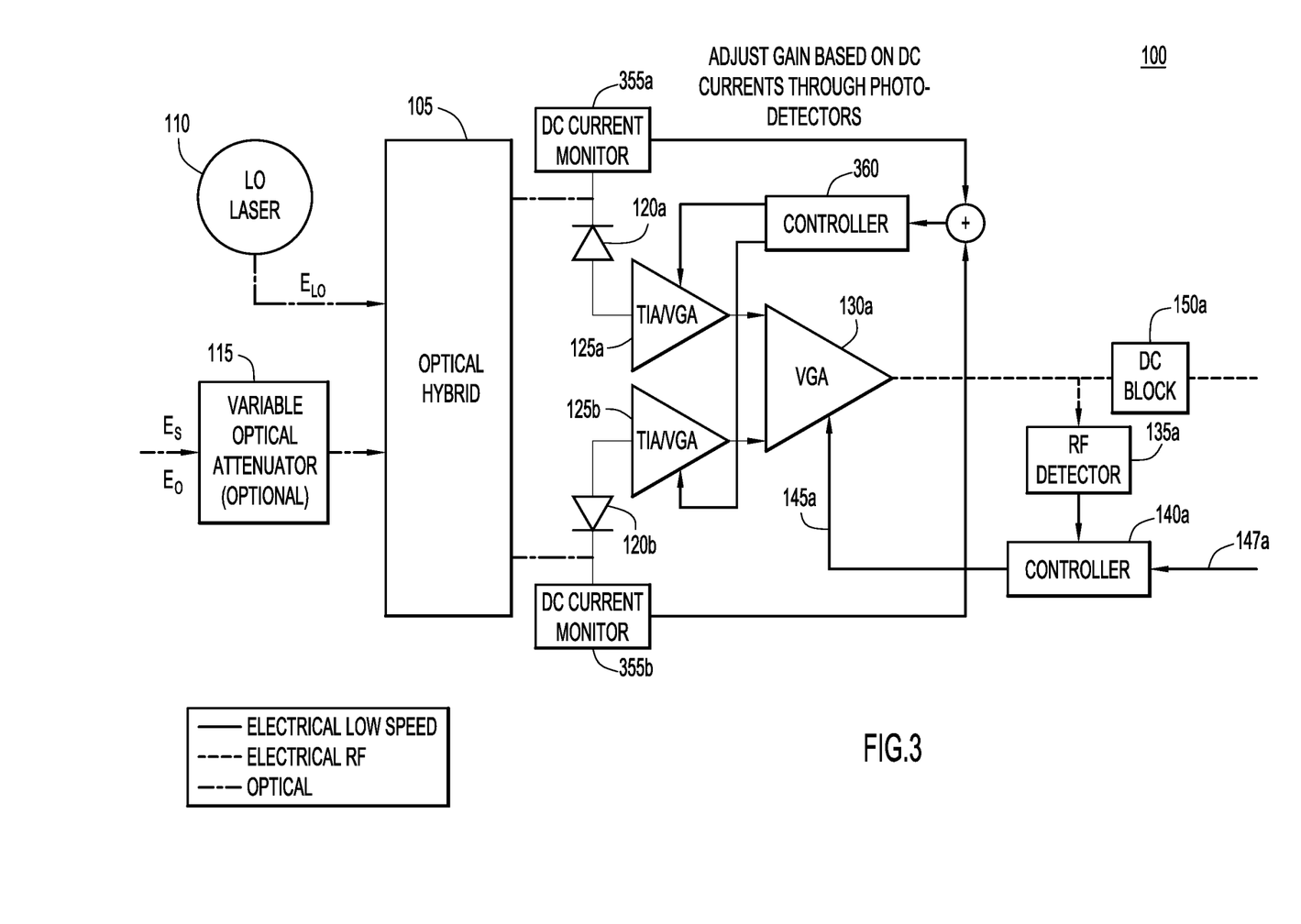
FIG. 3 is an example in-phase tributary of an optical receiver configured to provide common mode rejection ratio control in which a measure of the DC current through photodetectors is used to provide the common mode rejection ratio control, according to an example embodiment.

With reference now to FIG. 3, depicted therein is an example configuration to control the gain of a variable gain amplifier that measures the DC current through a photodetector. Specifically, FIG. 3 illustrates the in-phase signal tributary from FIG. 1, though the same techniques may also be applied to the quadrature signal path.

Included in FIG. 3 are two DC current monitors 355*a* and 335*b*. DC current monitor 355*a* measures the DC current through photodetector 120*a*, while DC current monitor 355*b* measures the DC current through photodetector 120*b*. The currents through photodetectors 120*a* and 120*b* can be viewed as a combination of a DC signal, which corresponds to the gain attributable to optical path and the respective photodetector, and an AC signal corresponding to the desired in-phase component of the input signal. Accordingly, the currents measured by DC current monitors 355*a* and 335*b* may be used to balance the gain of the first and second signal paths. According to the example of FIG. 3, a measure of the DC current through photodetector 120*a* is combined with the inverse of the measure of the DC current through photodetector 120*b*. The combined signal is fed to controller 360 which uses the combined signal to balance the gain of the first in-phase tributary with the gain in the second in-phase tributary.

Depending on the magnitude and sign of the combined signal, controller 360 can alter the gain of variable amplifiers 125*a* and 125*b* in order to balance the gain of the first in-phase signal tributary with the gain in the second in-phase signal tributary. For example, if the combined signal received by controller 360 has a positive value, a combination of decreasing the gain in variable amplifier 125*a* and/or increasing the gain in variable amplifier 125*b* may be performed to balance the total gain in the two signal tributaries. Similarly, if the combined signal received by controller 360 has a negative value, a combination of decreasing the gain in variable amplifier 125*b* and/or increasing the gain in variable amplifier 125*a* may be performed to balance the total gain in the two signal tributaries.

Figure 4:
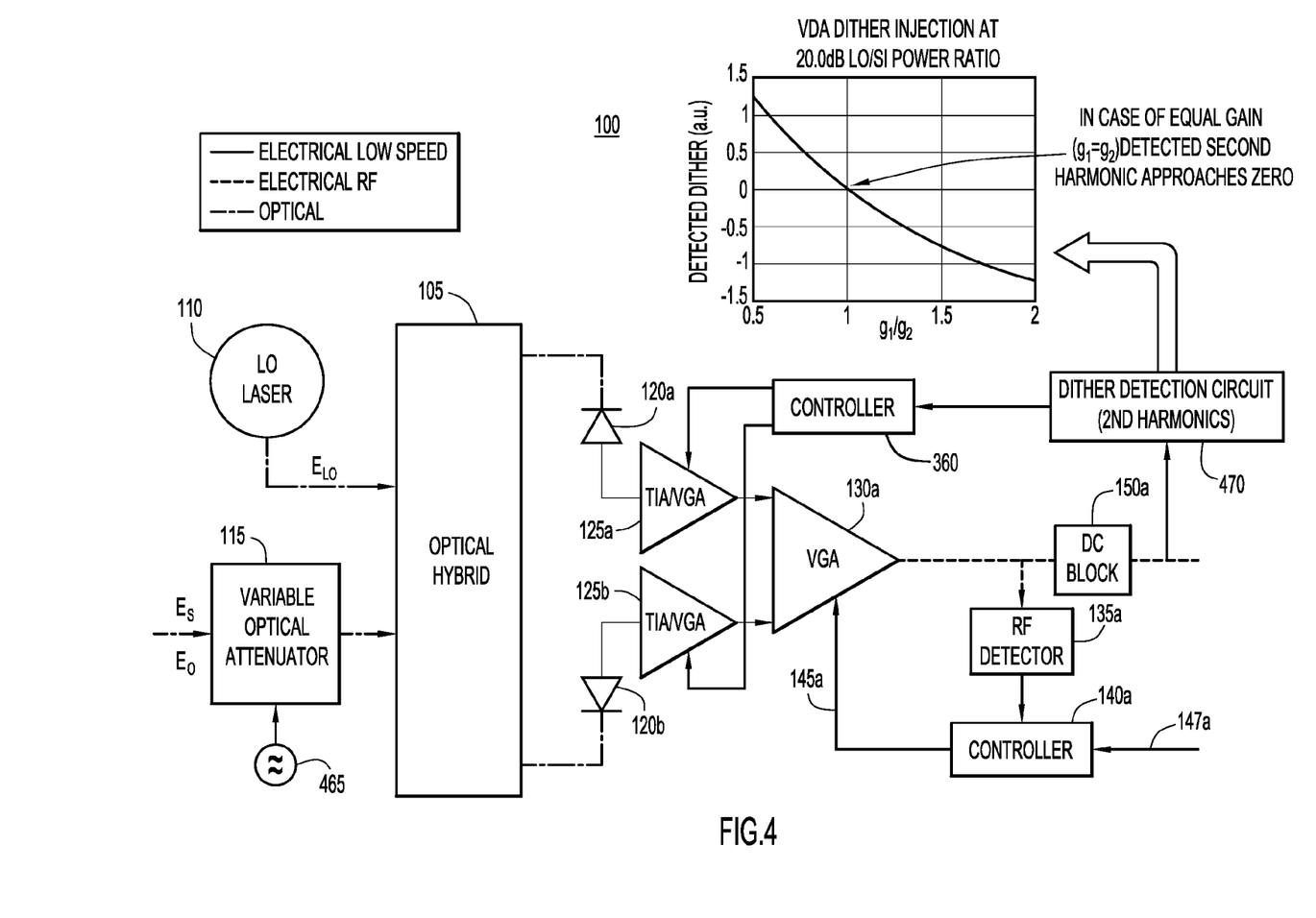
FIG. 4 is a second example in-phase tributary of an optical receiver in which a dither signal is applied to an optical attenuator in order to provide the common mode rejection ratio control, according to an example embodiment.

With reference now to FIG. 4, depicted therein is another configuration to control variable gain amplifiers 125*a* and 125*b*. In FIG. 4, a dither or tone signal 465 is injected into variable optical attenuator 115. Dither signal 465 may comprises a relatively low speed (e.g. a signal in the kilohertz range) oscillating signal, which when injected into the optical attenuator 115 will serve to modulate the undesired direct detected components of the signals output from optical hybrid 105 and detected by photodetectors 120*a* and 120*b*. If photodiodes are used as photodetectors 120*a* and 120*b*, photodetectors 120*a* and 120*b* will operate as square law detectors. Accordingly, the output current of photodetectors 120*a* and 120*b* will be the square of the input electrical fields. Therefore, the outputs of the square law detection of photodetectors 120*a* and 120*b* will generate a second harmonic of the injected dither tone. Dither detection circuit 470 is placed at the output of coherent receiver 100 to measure the second harmonic.

When the gain of the first signal tributary matches that of the second signal tributary, the amplitude of the second harmonic detected by dither detection circuit 470 will be zero, as differential amplifier 130*a* will cause the directly detected components to cancel each other out. On the other hand, if the gain of the first signal tributary is not balanced with the gain of the second signal tributary, the amplitude of the second harmonic will have a value other than zero. By passing the value of the amplitude of the second harmonic to controller 360, variable gain amplifiers 125*a* and 125*b* may be controlled to balance the gain of the first signal tributary with that of the second signal tributary, resulting in an amplitude of zero for the second harmonic.

Figure 5:
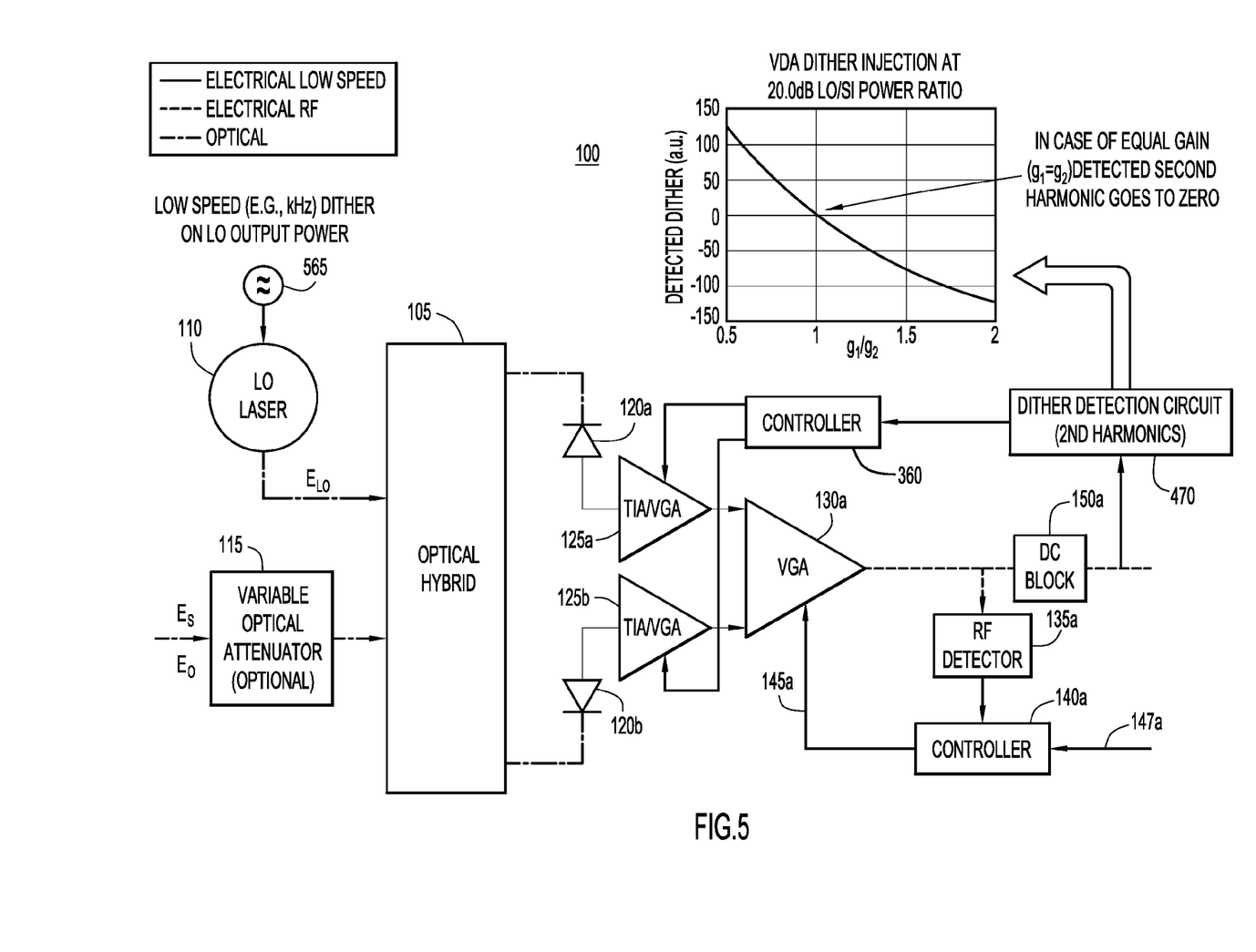
FIG. 5 is a third example in-phase tributary of an optical receiver in which a dither signal is applied to a local oscillator in order to provide the common mode rejection ratio control, according to an example embodiment.

With reference now made to FIG. 5, depicted therein is another method of balancing the gain of a first signal tributary with that of a second signal tributary through the use of a dither signal. The example of FIG. 5 differs from that of FIG. 4 in that dither signal 565 is injected into local laser oscillator 110. Accordingly, the local oscillator 110 signal will be modulated by the relatively low speed dither signal 565, and when detected by photodetectors 120*a* and 120*b* will generate a second harmonic of the local oscillator component of the signal.

When the gain of the first signal tributary matches that of the second signal tributary, the amplitude of the second harmonic detected by dither detection circuit 470 will be zero, as differential amplifier 130*a* will cause the square law detected portions of the local oscillator components to cancel each other out. On the other hand, if the gain of the first signal path is not balanced with the gain of the second signal path, the amplitude of the second harmonic will have a value other than zero. By passing the value of the amplitude of the second harmonic to controller 360, variable gain amplifiers 125*a* and 125*b* may be controlled to balance the gain of the first signal tributary with that of the second signal tributary, resulting in an amplitude of zero for the second harmonic.

Figure 6:
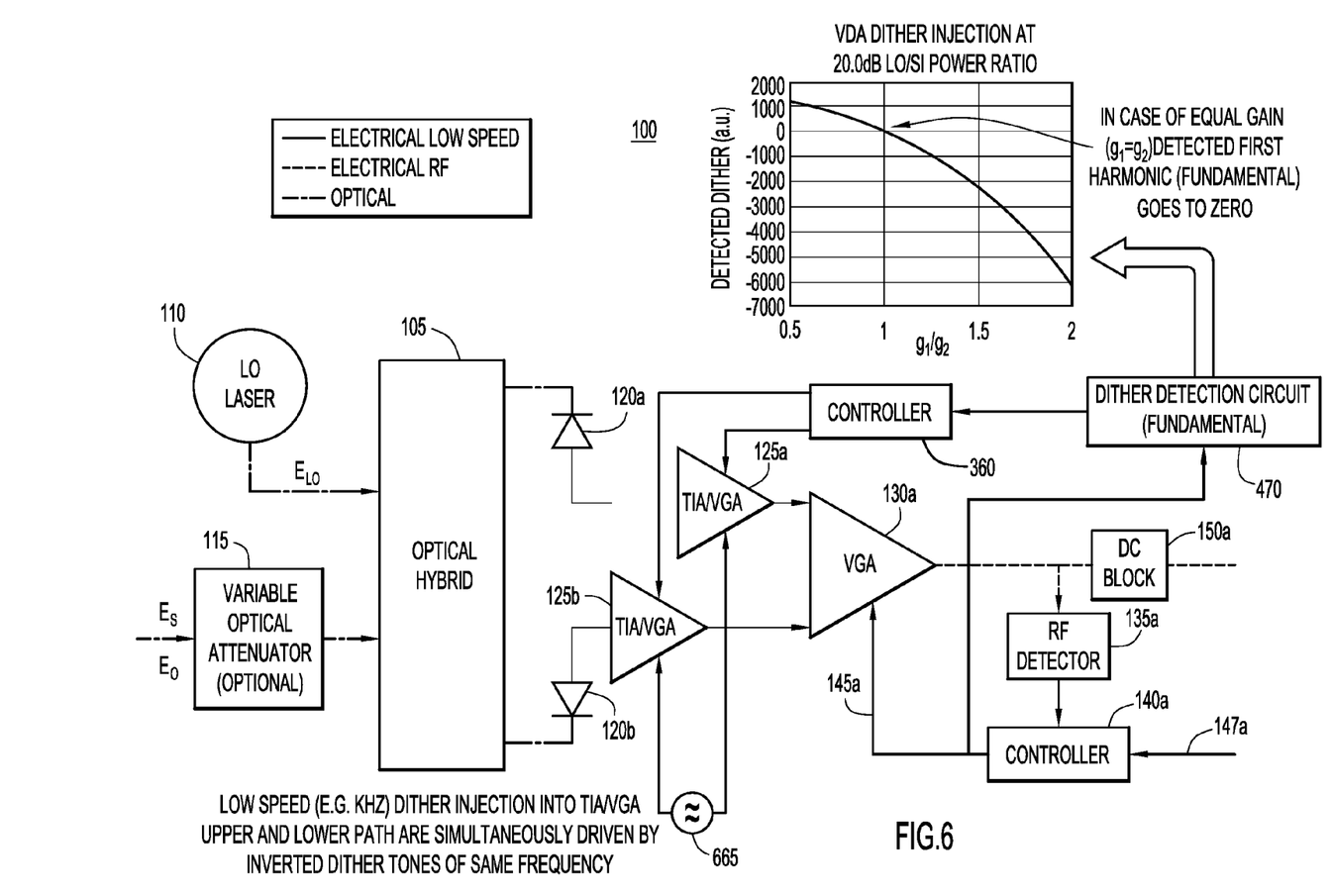
FIG. 6 is a fourth example in-phase tributary of an optical receiver in which a dither signal is applied to variable gain amplifiers in order to provide the common mode rejection ratio control, according to an example embodiment.

Turning to FIG. 6, depicted therein is an example method of balancing the gain of the first signal tributary with that of the second signal tributary using dither, but differs from the examples of FIGS. 4 and 5 in that the dither signal 665 is injected into the variable gain amplifier 125*a* and with 180° phase shift (i.e., inverted) into variable gain amplifier 125*b*, not into the inputs to optical hybrid 105. When the dither is injected into variable gain amplifiers 125*a* and 125*b*, some portion of the dither signal may appear in the output of differential amplifier 130*a* unless the gains along the first and second signal paths are balanced. Specifically, the dither will increase the gain in one of the tributaries while decreases the gain in the other tributary. When the CMRR is high, these differences in gain will cancel out on the signal detected from the output of differential amplifier 130*a*.

As discussed above in reference to FIG. 1, RF detector 135*a* and controller 140*a* serve as a feedback control ensuring a specific signal swing in the output of differential amplifier 130*a*. Due to the presence of dither in the output of differential amplifier 130*a*, the control signal 145*a* output by controller 140*a* will change in order to compensate for the dither. Accordingly, the control signal 145*a* output from controller 140*a* will change in response to the dither present in the output of differential amplifier 130*a*. By providing the control signal 145*a* to dither detection circuit 470, dither detection circuit 470 can determine whether or not dither is present in the output of variable gain amplifier 130*a*. Specifically, dither detection circuit 470 may be configured to detect the first harmonic (i.e., fundamental frequency) of the dither signal in the control signal 145*a* sent by controller 140*a*. The amplitude of the first harmonic may be sent to controller 360, which utilizes this value to control the gain of one or more of variable amplifiers 125*a* and 125*b* to balance the gain of the first signal tributary and the second signal tributary. According to other examples, RF detector 135*a* may be configured to directly feed into the dither detection circuit 470.

Figure 7:
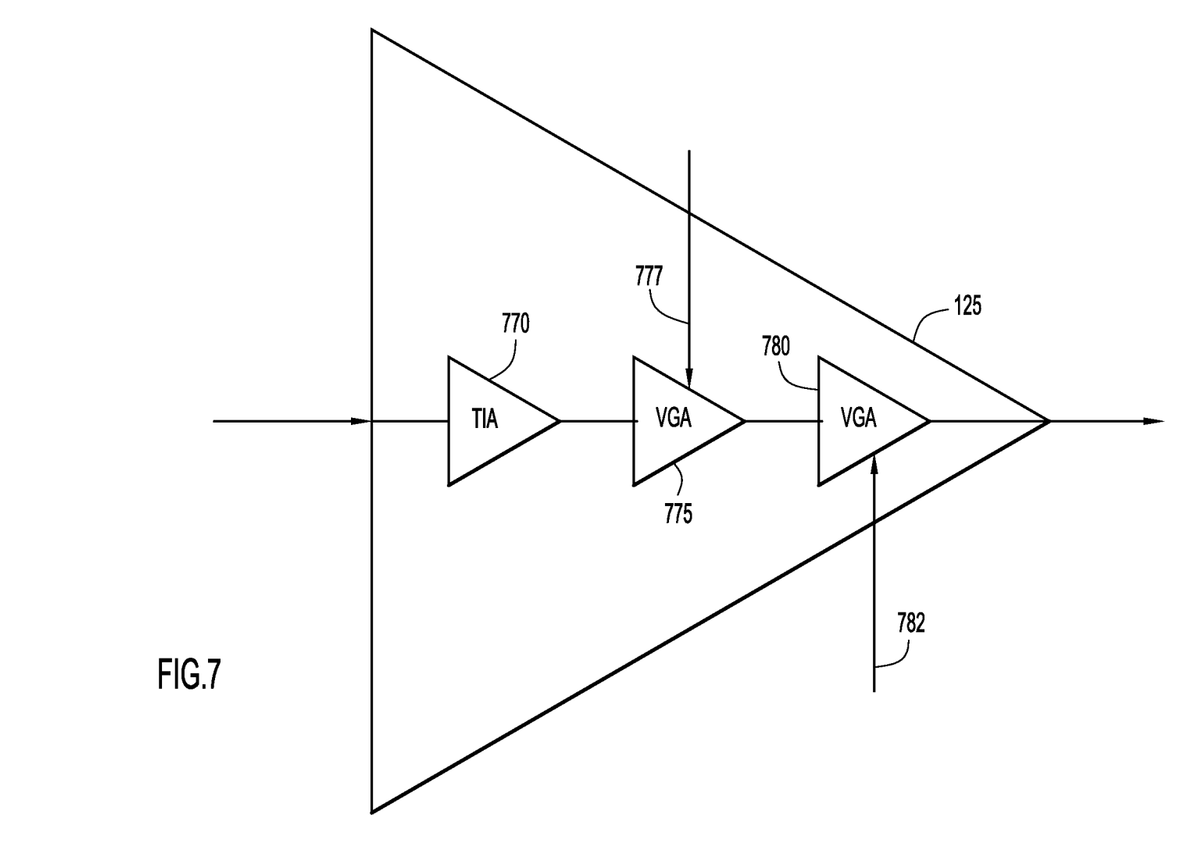
FIG. 7 is a detailed view of a variable gain amplifier configured to provide common mode rejection ration control according to an example embodiment.

With reference now made to FIG. 7, depicted therein is a detailed view of variable gain amplifier generally denoted by reference numeral 125, which variable gain amplifier may be used to balance the gain over a first signal tributary and a second signal tributary in a coherent optical receiver. In FIG. 7 variable gain amplifier 125 is illustrated as being comprised three separate devices. Specifically, variable gain amplifier 125 is illustrated as including a transimpedance amplifier 770, a first variable gain amplifier 775 and a second variable gain amplifier 780. The three devices 770, 775 and 780 are used to illustrate the multiple functions performed by variable gain amplifier 125. In reality, variable gain amplifier may be embodied in fewer or more actual devices than are depicted in FIG. 7. When incorporated into a single device, a well defined relation between the control signal and the change in gain may be required.

Transimpedance amplifier 770 is configured to receive the current modulated signal output from a photodetector, such as photodetectors 120*a* and 120*b* of FIGS. 3-6, and convert it to a voltage modulated signal. The voltage modulated signal is input to first variable gain amplifier 775, which is configured to receive a control signal 777 from a controller, such as controller 360 if FIGS. 3-6. The control signal 777 received by variable gain amplifier 775 allows the first variable gain amplifier 775 to balance the gain between the tributary that includes variable amplifier 125, such as the tributary that includes variable gain amplifier 125*a* of FIGS. 3-6, and a second tributary, such as the tributary that includes variable gain amplifier 125*b* of FIGS. 3-6.

Also included in variable gain amplifier 125*a* is second variable gain amplifier 780. Second variable gain amplifier 780 is included in variable gain amplifiers which are configured to receive a dither injection, such as variable gain amplifiers 125*a* and 125*b* of FIG. 6. According to other examples, such as those of FIGS. 3-5, second variable gain amplifier 780 may be omitted from variable gain amplifier 125. Similarly, the order of second variable gain amplifier 780 and first variable gain amplifier 775 may be reversed. Dither signal 782 is a control signal that alters the gain of variable gain amplifier 780 according to the desired dither to be added to the output of variable gain amplifier 125.

Figures 8A, 8B:
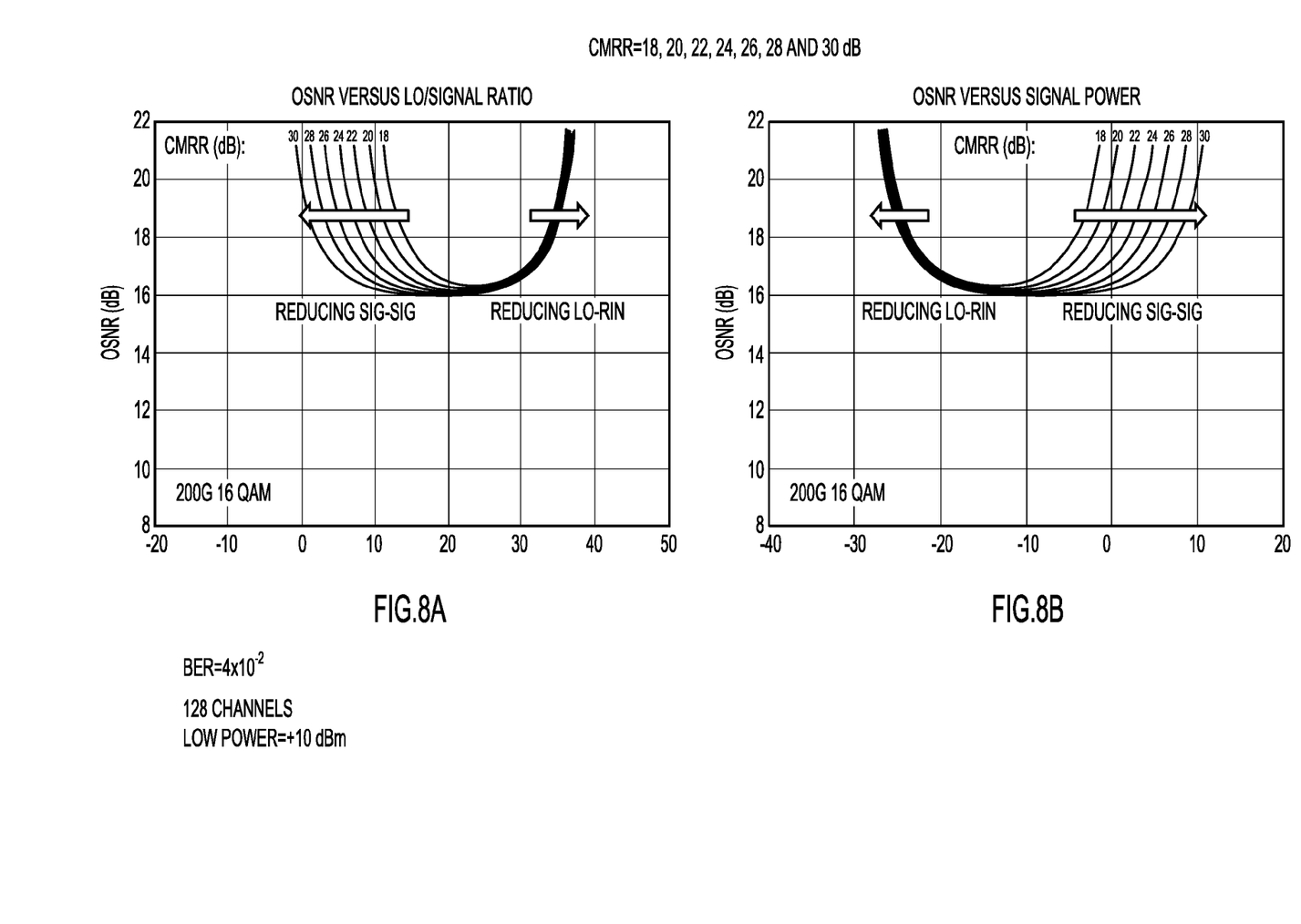
FIG. 8A illustrates optical signal-to-noise ratio as a function of local oscillator-to-signal ratio for a number of common mode rejections ratios achieved according to an example embodiment.
FIG. 8B illustrates optical signal-to-noise ratio as a function of signal power for a number of common mode rejections ratios achieved according to an example embodiment.

With reference now made to FIGS. 8A and 8B, depicted therein are graphs illustrating the benefits that can be achieved through the implementation of the common mode rejection ratio compensation techniques described herein in reference to FIGS. 1-7. FIG. 8A illustrates how an increased common mode rejection ratio can improve the performance of a coherent optical receiver. Specifically, FIG. 8A shows a plot of the optical signal-to-noise ratio for a 200G 16QAM coherent optical receiver having 128 channels vs. the local oscillator to signal power ratio at a number of common mode rejection ratios achieved according to the techniques presented herein. As illustrated in FIG. 8A, as the common mode rejection ratio is increased through the techniques presented herein, there is substantial broadening of the range of local oscillator to signal ratio values over which the 128 channel input signal can be successfully received.

FIG. 8B, shows a plot of the optical signal-to-noise ratio for a 200G 16QAM coherent optical receiver having 128 channels vs. signal power over a number of common mode rejection ratios achieved according to the techniques presented herein. As with the local oscillator-to-signal ratio values of FIG. 8A, there is also a significant broadening of the range of signal power values that can be successfully received at the coherent optical receiver. Accordingly, the techniques taught herein provide improved system performance of coherent optical receivers for long-haul transmission systems in a multi-channel system without optical filters.

In summary, according to one aspect, a method is provided comprising: receiving an optical signal at a coherent optical receiver; converting the received optical signal to a first electrical signal and a second electrical signal through a first photodetector and a second photodetector, respectively; inputting/supplying the first electrical signal into a first single input variable gain amplifier; inputting/supplying the second electrical signal into to a second single input variable gain amplifier; controlling a gain of at least one of the first single input variable gain amplifier or the second single input variable gain amplifier to balance the output of the first single input variable gain amplifier and the output of the second single input variable gain amplifier; inputting/supplying the output of the first single input variable gain amplifier and the output of the second single input variable gain amplifier into a differential amplifier; and obtaining a receiver output at an output of the differential amplifier.

According to another aspect, an apparatus is provided comprising: a coherent optical receiver that includes: a first photodetector configured to convert a received optical signal to a first electrical signal; a second photodetector configured to convert the received optical signal to a second electrical signal; a first single input variable gain amplifier configured to receive the first electrical signal; a second single input variable gain amplifier configured to receive the second electrical signal; a differential amplifier configured to receive an output of the first single input variable gain amplifier and an output of the second single input variable gain amplifier; and a controller configured to control a gain of at least one of the first single input variable gain amplifier or the second single input variable gain amplifier to balance the output of the first single input variable gain amplifier and the output of the second single input variable gain amplifier.

According to still another aspect, a method is provided comprising: measuring an electrical signal corresponding to an optical signal input to a coherent optical receiver; determining a difference in a gain along a first tributary of the coherent optical receiver and a gain along a second tributary of the coherent optical received; and controlling the gain of at least one of a variable gain amplifier of the first tributary or a variable gain amplifier of the second tributary to balance the gain along the first tributary and the gain along the second tributary.

The above description is intended by way of example only.

What is claimed is:

1. A method comprising:
   receiving an optical signal at a coherent optical receiver;
   converting the received optical signal to a first electrical signal and a second electrical signal through a first photodetector and a second photodetector, respectively;
   applying a known dither to at least one of: the received optical signal, the first electrical signal or the second electrical signal;
   inputting the first electrical signal into a first single input variable gain amplifier;
   inputting the second electrical signal into to a second single input variable gain amplifier;
   inputting the output of the first single input variable gain amplifier and the output of the second single input variable gain amplifier into a differential amplifier; and
   obtaining a receiver output at an output of the differential amplifier;
   analyzing the receiver output; and
   controlling a gain of at least one of the first single input variable gain amplifier or the second single input variable gain amplifier based on the known dither and the receiver output to balance the output of the first single input variable gain amplifier and the output of the second single input variable gain amplifier.

2. The method of claim 1, wherein applying the known dither comprises applying the known dither to the received optical signal.

3. The method of claim 1, wherein analyzing the receiver output comprises measuring in the receiver output a second harmonic of the known dither.

4. The method of claim 1, wherein applying the known dither comprises applying the known dither to a local oscillator of the coherent optical receiver.

5. The method of claim 4, wherein analyzing the receiver output comprises measuring in the receiver output a second harmonic of the known dither.

6. The method of claim 1, wherein applying the known dither comprises applying the known dither to each of the first single input variable gain amplifier and the second single input variable gain amplifier.

7. The method of claim 6, wherein analyzing the receiver output comprises measuring in the receiver output a first harmonic of the known dither.

8. The method of claim 1, wherein the first electrical signal and the second electrical signal are derived from a quadrature component of the optical signal.

9. The method of claim 1, wherein the first electrical signal and the second electrical signal are derived from an in-phase component of the optical signal.

10. An apparatus comprising:
    a coherent optical receiver comprising:
    a first photodetector configured to convert a received optical signal to a first electrical signal;
    a second photodetector configured to convert the received optical signal to a second electrical signal;
    a first single input variable gain amplifier configured to receive the first electrical signal;
    a second single input variable gain amplifier configured to receive the second electrical signal;
    a differential amplifier configured to receive an output of the first single input variable gain amplifier and an output of the second single input variable gain amplifier; and
    a controller configured to:
    apply a known dither to at least one of: the received optical signal, the first electrical signal or the second electrical signal;
    obtain a receiver output at an output of the differential amplifier; and
    control a gain of at least one of the first single input variable gain amplifier or the second single input variable gain amplifier based on the known dither and the receiver output to balance the output of the first single input variable gain amplifier and the output of the second single input variable gain amplifier.

11. The apparatus of claim 10, further comprising a local oscillator providing a local oscillator signal to the coherent optical receiver, wherein the controller is configured to apply the known dither to the local oscillator.

12. The apparatus of claim 10, wherein the controller is configured to apply the known dither to each of the first single input variable gain amplifier and the second single input variable gain amplifier.

13. The apparatus of claim 10, wherein the controller is configured to apply the known dither to the received optical signal.

14. The apparatus of claim 10, wherein at least one of the first single input variable gain amplifier or the second single input variable gain amplifier comprises:
    a transimpedance amplifier;
    a first variable gain amplifier configured to receive a gain-adjusting control signal; and
    a second variable gain amplifier configured to receive a known dither.

15. The apparatus of claim 10, wherein the first electrical signal and the second electrical signal are derived from a quadrature component of the optical signal.

16. The apparatus of claim 10, wherein the first electrical signal and the second electrical signal are derived from an in-phase component of the optical signal.

17. A method comprising:
converting a signal from an optical domain to an electrical domain by passing the signal through a coherent optical receiver;
applying a known dither to the signal;
analyzing an output of the coherent optical receiver; and
controlling, based on the output of the coherent optical receiver and the known dither, a gain of at least one of a first single input variable gain amplifier of the optical receiver or a second single input variable gain amplifier of the optical receiver to provide common mode rejection ratio control to the coherent optical receiver.

18. The method of claim 17, wherein applying the known dither to the signal comprises applying the known dither through a local oscillator signal of the coherent optical receiver.

19. The method of claim 17, wherein applying the known dither to the signal comprises applying the known dither to each of the first single input variable gain amplifier and the second single input variable gain amplifier.

20. The method of claim 17, wherein applying the known dither to the signal comprises applying the known dither to an optical signal received by the coherent optical receiver.

* * * * *